Patented Sept. 12, 1939

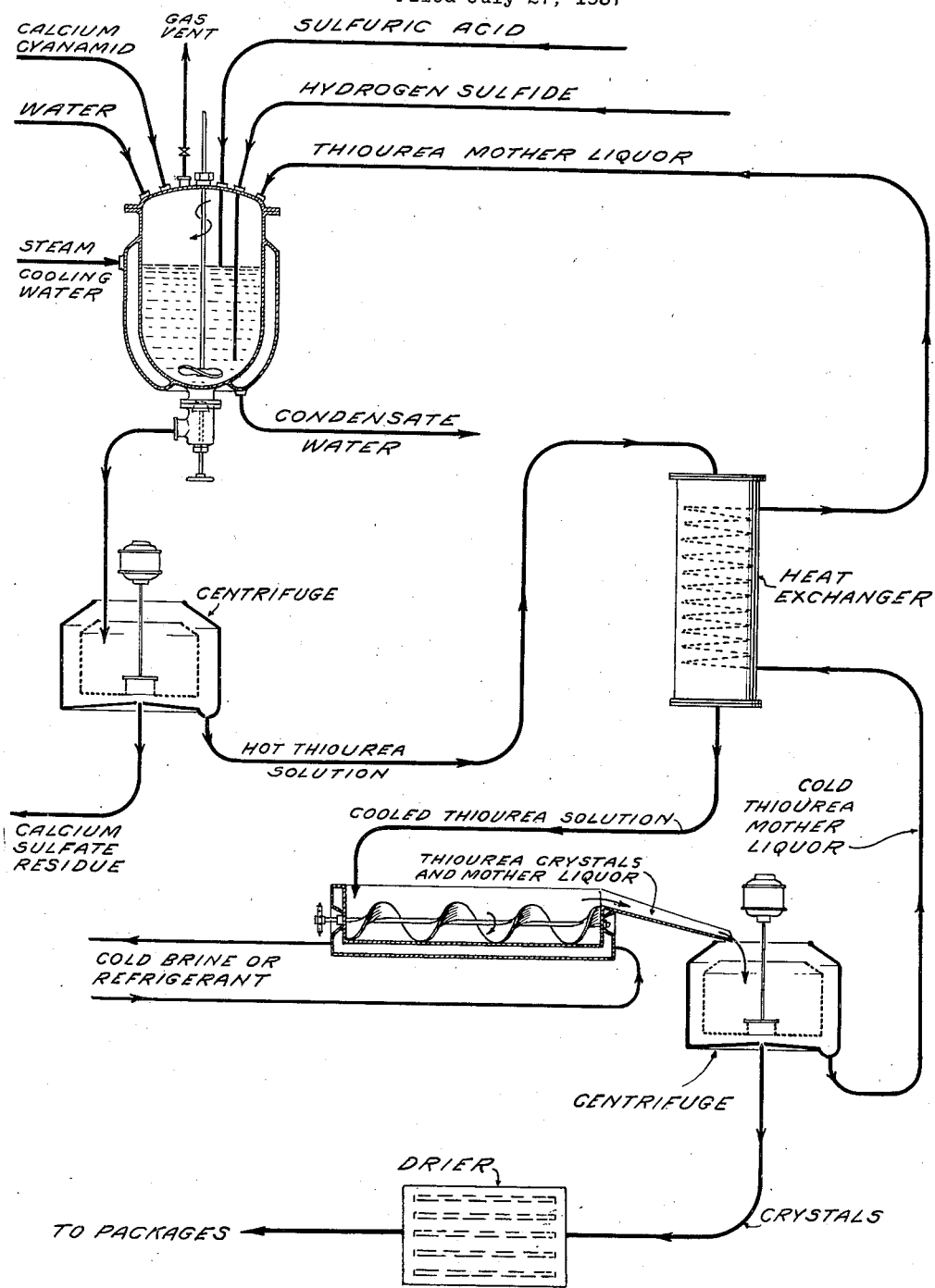

2,173,067

UNITED STATES PATENT OFFICE 2,173,067

MANUFACTURE OF THIOUREA

Richard O. Roblin, Jr., Old Greenwich, Conn., assignor to American Cyanamid Company, New York, N. Y., a corporation of Maine Application July 27, 1937, Serial No. 155,905

14 Claims. (Cl. 260—552)

The present invention relates to the production of thiourea.

The first object of the invention is to devise methods wherein crystals of thiourea of high purity may be readily and cheaply obtained from solutions thereof regardless of the specific method of initial thiourea synthesis.

Another object of the invention resides in a process for the production of thiourea requiring only simple apparatus with high efficiencies.

Many methods of thiourea synthesis have been proposed in which that desired material is produced in solution. If crystals are to be obtained therefrom, various methods of evaporation of the liquid have been resorted to with removal of the crop of crystals which, however, leave in all cases a mother liquor containing some quantities of thiourea in solution. These heretofore proposed methods have not carried the recovery of crystals from the solution to completion because of the economic problem involved.

For instance, Patent 1,889,959 to Heuser proposes the synthesis of thiourea from phosphorus pentasulphide, ammonia and calcium cyanamid by reaction in an autoclave and then recovering thiourea crystals from the liquid reaction product by evaporation. It has been found economically undesirable to recover the entire quantity of thiourea from such solutions by evaporation due to the fact that undesirable impurities are concentrated in such ultimate evaporation which contaminate the thiourea crystals. Consequently, there remains in the process quantities of mother liquor containing varying amounts of thiourea which cannot be economically removed therefrom.

Patent 1,991,852 to Heuser proposes the synthesis of thiourea from free cyanamid and ammonium hydrosulphide. This patent, as that above referred to, suggests the evaporation of the thiourea liquor for crystal recovery. It however, stops short of complete recovery of all of the values from the thiourea liquid in that there remains a mother liquor containing values which are lost.

It has now been discovered that regardless of the methods of synthesis of thiourea, where this product exists from the reaction in solution, practically quantitative amounts of thiourea crystals may be recovered by cooling the solution to a temperature sufficiently low to produce super-saturation, separating the crystals thrown down and then returning the mother liquor saturated with thiourea at the working temperature to the system and cycle. If, on the first run of the cycle the thiourea solution thus produced is too dilute to recover material quantities of crystals therefrom upon lowering the temperature the desired amount, this situation remedies itself automatically upon return of such solutions to the cycle for the resulting thiourea solution becomes more and more concentrated, the point eventually being reached where good crops of pure crystals may be obtained.

It will be observed that this method of recovery of crystals may be successfully practiced regardless of the particular method of thiourea synthesis, so long as the end product, prior to crystal separation, is thiourea in solution, without contaminating impurities other than calceum sulfate, which, due to its slightly greater solubility at lower temperatures, will not be precipitated when the solution is cooled. It, therefore constitutes an improvement upon methods already practical.

Numerous processes other than the above, for the production of thiourea from alkaline earth metal salts of cyanamid, particularly calcium cyanamid, and hydrogen sulphide, have been proposed. Various methods have been devised to eliminate the formation of by-products and obtain a complete conversion of the cyanamid to thiourea. None of these methods has been satisfactory from the point of view of eliminating contaminants and obtaining complete conversion and recovery while at the same time being commercially practicable.

High temperatures have been known to favor the conversion but under the highly alkaline conditions which prevailed, the formation of by-products such as dicyandiamid, guanidine and urea have made the use of high temperatures non-commercial.

It has now been discovered by this applicant that thiourea synthesis may be practiced with desirable efficiencies making use of high temperatures which result in rapid and complete conversion of calcium cyanamid to thiourea by a control of the pH of the reaction medium. This control is readily obtained by making use of the fact that a solution of calcium sulphide and calcium acid sulphide in equilibrium with hydrogen sulphide acts as a buffer maintaining the pH of the solution at approximately 8.3 according to the following reactions:

$$2CaS + 2H_2O \rightleftarrows Ca(HS)_2 + Ca(OH)_2$$
$$Ca(HS)_2 + 2H_2O \rightleftarrows 2H_2S + Ca(OH)_2$$

The above equilibrium may be maintained by the gradual addition of sulphuric acid during the heating period. This brings in the continuous liberation of hydrogen sulphide to replace that used up in the reaction.

In order to make the process cyclic, avoiding the necessity for evaporation, and eliminate the presence of inorganic calcium salts in the final product, where calcium cyanamid is one of the starting materials, a water solution of thiourea saturated at a working temperature is used in preference to pure water.

The invention, therefore, further contemplates the manufacture and recovery of thiourea by reacting a cyanamid with hydrogen sulphide in the presence of a solution of thiourea saturated at a desired temperature, followed by the gradual addition of sulphuric acid and temperatures of the order of 70 to 80° C. When the reaction is complete, the solid and liquid products are discharged to a separation device, the cake, consisting principally of calcium sulphate, rejected, and crystals of thiourea recovered from the filtrate by the cooling method above described. The mother liquor saturated at the working temperature is then to be returned to the cycle. By reason of this method, substantially quantitative amounts of thiourea may be recovered uncontaminated with impurities which usually accompany thiourea produced from cyanamid. The mother liquor may be re-used indefinitely, and it is unnecessary to recrystallize the product. In addition, losses occasioned by the solubility of thiourea in water are eliminated.

The invention further contemplates the novel steps and combination of steps hereinafter described in more detail.

The flow sheet illustrates a crystal recovery set up in combination with a particular method of thiourea synthesis, although it is to be understood that any other synthesis may be substituted for that described so long as the liquid delivered to the crystal recovery system is substantially free from undesirable and contaminating products.

Referring now particularly to the flow sheet, a new method of thiourea synthesis consists generally in delivering to an autoclave a slurry of calcium cyanamid in a mother liquor saturated with theiourea at a definite temperature. While the cyanamid of calcium is to be preferred, yet this is not essential as other alkaline earth metal cyanamids may be substituted therefor.

To this reaction mixture is added an excess of hydrogen sulfide over that required to convert all the cyanamid to thiourea. Tfter a positive pressure of hydrogen sulfide has been built up by the gradual addition of sulfuric acid, the temperature is raised to the point where a thiourea producing reaction will take place with optimum efficiencies, 70 to 80° C. is preferred. The gradual addition of sulfuric acid is continued until the reaction is complete. The solid impurities and the thiourea in solution is discharged from the reaction vessel to a separation equipment preferably a centrifuge, where the cake is rejected. If desired, the cake may be extracted with water to recover the residual thiourea and this solution used to make up any losses resulting from the cyclic process.

The hot thiourea liquor from this or any other process may then be passed with or without suitable heat exchange to a crystallizer, cooled or refrigerated to a temperature sufficiently low to reach supersaturation and throw down desirable quantities of crystals. The crystals and the mother liquor saturated with thiourea at that temperature then pass to a separation equipment where the crystals are removed, passed to a drier of either the atmospheric or vacuum type and finally packaged. The saturated solution of thiourea may then be returned to the cycle either with or without heat exchange with the thiourea liquor going to the crystallizer, and the process repeated.

If, perchance, the thiourea liquor going to the crystallizer does not contain sufficient thiourea to cause an adequate crop of crystals to be obtained in this step, this is of no moment inasmuch as in the next or other cycles its concentration will be increased to the point where optimum quantities of crystals are obtainable therefrom.

*Example*

100 parts of commercial calcium cyanamid containing 21% cyanamid nitrogen are suspended in 900 parts of a water solution of thiourea returned from the crystal separator as hereinafter described, in an aluminum autoclave equipped with a stirring device and jacketed for steam or cooling water. The water solution may conveniently consist of a solution saturated with thiourea at 0° C., that is, with about 5 parts of thiourea per 100 parts of water. To the resulting slurry, 35 parts of hydrogen sulphide (20 to 30% in excess of the amount required to convert the cyanamid to thiourea) are added by absorbing the gas under a slight positive pressure, that is, from 2 to 3 inches of water. During this period, the autoclave agitator is operated at slow speed in order to assure efficient absorption. The temperature should be maintained at from 20 to 30° C. by means of cooling water circulating through the jacket. When the absorption of hydrogen sulphide is complete, sulphuric acid of a specific gravity of 1.27 is added until a pressure of from ½ to 1 atmosphere of hydrogen sulphide has been obtained.

During this period, the agitation should be maintained at a higher rate (approximately 300 R. P. M.) and the cooling continued. Steam may then be admitted to the jacket and the rate of sulphuric acid addition adjusted so that a pressure of approximately 1 atmosphere of hydrogen sulphide maintained while the autoclave is being heated. Heating is continued at from 70 to 80° C. for from 20 to 30 minutes whereupon the reaction is complete. The excess pressure is released through the gas vent. The resulting sludge is then made slightly acid to phenolphthalein by the further addition of sulphuric acid if necessary, the total quantity of acid used being approximately 286 parts for the quantities above given.

While still warm, the autoclave product is discharged into a basket type centrifuge and the calcium sulphate residue cake rejected. The filtrate containing thiourea in solution then passes to a heat exchanger where it gives up its sensible heat to the saturated thiourea mother liquor being returned to the autoclave. The cooled thiourea solution then flows into a crystallizer, the temperature of which is maintained at approximately 0° C. In this piece of equipment the thiourea crystals are thrown out, the crystals and solution then passing to a second centrifuge. The wet crystals from the separator are then passed to either an atmospheric or vacuum drier and from thence to storage or packages. The thiourea solution from the second centrifuge, saturated at 0° C. is then passed in heat exchange relation to the heated filtrate from the autoclave, being warmed thereby and is eventually discharged into the autoclave and cycle.

On the basis of 10 consecutive runs as above set forth, the conversion to thiourea including an assay of the discarded filter cake was 98.5%. The product after being dried at room temperature analyzed substantially 100% pure thiourea on the basis of both nitrogen and sulphur content. Tests for contaminants such as urea, dicyandiamid, guanidine and guanyl thiourea were negative.

I claim:

1. A cyclic method of manufacturing crystals of thiourea which includes the steps of synthesizing thiourea in the presence of a solution of thiourea, cooling the liquid reaction product to a temperature sufficiently low to drop out crystals of thiourea, separating the latter from the thiourea mother liquor and returning the mother liquor to the cycle.

2. A cyclic method of manufacturing crystals of thiourea which includes the steps of synthesizing thiourea from a cyanamid and an inorganic sulphide in the presence of a solution of thiourea, cooling the liquid reaction product to a temperature sufficiently low to drop out crystals of thiourea, separating the latter from the thiourea mother liquor and returning the mother liquor to the cycle.

3. A cyclic method of manufacturing crystals of thiourea which includes the steps of synthesizing thiourea from calcium cyanamid and an inorganic sulphide in the presence of a solution of thiourea, gradually adding a quantity of sulphuric acid sufficient to maintain a positive pressure of at least ½ atmosphere above normal, separating the solid from the liquid reaction products, cooling the latter to a temperature sufficiently low to throw down crystals of thiourea, separating the crystals from the thiourea mother liquor and returning the latter to the cycle.

4. A cyclic method of manufacturing thiourea which includes the steps of reacting hydrogen sulphide with a slurry of an alkaline earth metal cyanamid in a saturated solution of thiourea, the hydrogen sulphide used being in excess of that required to convert all of the cyanamid to thiourea, gradually adding sulphuric acid in a quantity sufficient to maintain a positive pressure of at least ½ atmosphere above normal, separating the calcium sulphate therefrom and recovering the thiourea from the solution.

5. A cyclic method of manufacturing crystals of thiourea which includes the steps of reacting hydrogen sulphide with a slurry of an alkaline earth metal cyanamid in a saturated solution of thiourea, the hydrogen sulphide used being in excess of that required to convert all the cyanamid to thiourea, gradually adding $H_2SO_4$ in a quantity sufficient to maintain a positive pressure of at least ½ atmosphere above normal, separating the alkaline earth metal sulphate therefrom, cooling the liquid to a temperature sufficient to throw down crystals of thiourea, separating the thiourea crystals from the mother liquor and returning the latter to the cycle.

6. A cyclic method of manufacturing crystals of thiourea which includes the steps of reacting hydrogen sulphide with a slurry of calcium cyanamid in a saturated solution of thiourea, the hydrogen sulphide used being in excess of that required to convert all the cyanamid to thiourea, gradually adding sulphuric acid in a quantity sufficient to maintain a positive pressure of at least ½ atmosphere above normal, separating the thiourea crystals from the mother liquor and returning the latter to the cycle.

7. The method of claim 6 in which the hydrogen sulphide used is from 20 to 30% in excess of that required to convert all the cyanamid to thiourea.

8. The method of claim 6 in which the cyanamid-hydrogen sulphide reaction is carried out under a positive pressure of from ½ to one atmosphere above normal.

9. The method of claim 6 in which the sulphuric acid addition is made at a rate sufficient to maintain a positive pressure in the reaction vessel of from ½ to one atmosphere above normal.

10. The method of claim 6 in which the cyanamid-hydrogen sulphide reaction is carried out at between 20 and 30° C.

11. The method of claim 6 in which the temperature of the mix during the sulphuric acid addition is maintained at 70 to 80° C.

12. The method of claim 6 in which the sulphuric acid addition is carried out under a positive pressure of from ½ to one atmosphere above normal and at a temperature of from 70 to 80° C.

13. A cyclic method of manufacturing crystals of thiourea which includes the steps of reacting hydrogen sulphide with a slurry of calcium cyanamid in a saturated solution of thiourea, the quantity of hydrogen sulphide used being from 20 to 30% in excess of that required to convert all the cyanamid to thiourea, the reaction being carried out at a temperature of between 20 and 30° C., gradually adding $H_2SO_4$, the acid addition being made at a rate sufficient to maintain a positive pressure of from ½ to one atmosphere above normal, the temperature of the reactants during the acid addition being maintained at from 70 to 80° C., separating the calcium sulphate from the thiourea solution, cooling the solution to a temperature sufficiently low to throw down crystals of thiourea, separating the thiourea crystals from the mother liquor and returning the mother liquor to the cycle.

14. The method of claim 6 in which the temperature of the mix during the sulphuric acid addition is maintained at 70 to 80° C., the pH of the reacting medium being maintained at substantially 8.3 by the gradual addition of sulphuric acid during the reaction period.

RICHARD O. ROBLIN, Jr.